(12) United States Patent
Suehiro

(10) Patent No.: US 7,782,476 B2
(45) Date of Patent: Aug. 24, 2010

(54) IMAGE FORMING APPARATUS AND FACSIMILE DATA TRANSFER METHOD OF IMAGE FORMING APPARATUS

(75) Inventor: Tatsuo Suehiro, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1093 days.

(21) Appl. No.: 11/426,639

(22) Filed: Jun. 27, 2006

(65) Prior Publication Data

US 2007/0002389 A1 Jan. 4, 2007

(30) Foreign Application Priority Data

Jun. 29, 2005 (JP) ............................. 2005-189844

(51) Int. Cl.
G06F 3/12 (2006.01)
H04N 1/46 (2006.01)
H04N 1/00 (2006.01)

(52) U.S. Cl. ..................... 358/1.15; 358/501; 358/505; 358/506; 358/401; 358/407

(58) Field of Classification Search ................ 358/1.15, 358/402; 713/154
See application file for complete search history.

(56) References Cited

U.S. PATENT DOCUMENTS

| | | | | |
|---|---|---|---|---|
| 5,600,762 A | * | 2/1997 | Salgado et al. ............. | 358/1.15 |
| 6,894,799 B2 | * | 5/2005 | Kuwahara et al. .......... | 358/1.15 |
| 7,095,521 B2 | * | 8/2006 | Yoshida ...................... | 358/1.15 |
| 7,227,654 B1 | * | 6/2007 | Tanaka ....................... | 358/1.15 |
| 7,274,476 B2 | * | 9/2007 | Eguchi et al. .............. | 358/1.15 |
| 7,564,577 B2 | * | 7/2009 | Atsumi ...................... | 358/1.15 |
| 7,596,691 B2 | * | 9/2009 | Koue et al. ................. | 713/154 |
| 2003/0117665 A1 | * | 6/2003 | Eguchi et al. .............. | 358/402 |

FOREIGN PATENT DOCUMENTS

JP 2002-135552 5/2002

* cited by examiner

*Primary Examiner*—King Y Poon
*Assistant Examiner*—Akwasi M Sarpong
(74) *Attorney, Agent, or Firm*—Patterson & Sheridan, LLP

(57) ABSTRACT

An image forming apparatus determines whether or not a number for executing F-code relay is designated to facsimile data having at least transmitting terminal identification data added thereto, the facsimile data being received from the outside. When it is determined that a number is not designated, the apparatus searches from memory means a transfer box to which a name corresponding to the transmitting terminal identification data has been assigned when a transfer function based on a transfer setting set in a transfer box corresponding to a number denoted by the transmitting terminal identification data is made available. When it is determined that F-code information denoting F-code relay is stored so as to be associated with the searched transfer box, the apparatus performs predetermined processing without performing transfer according to the transfer setting set in the transfer box corresponding to the number denoted by the transmitting terminal identification data.

3 Claims, 9 Drawing Sheets

F-code setting

F-code setting

23f

[Store] [Cancel]

*Compulsory input

| *Box number | 03 3123 4567 |
| Password | 123456 |
| User name | |
| Comment | |
| Report notification | ☐ Transmit error message<br>☐ Transmit job completion message<br>E-mail address  XXXXXXXXXX@XX.jp |
| Document printing | [Print ▶] |

FIG. 7

IMAGE FORMING APPARATUS AND FACSIMILE DATA TRANSFER METHOD OF IMAGE FORMING APPARATUS

CROSS-REFERENCE TO RELATED APPLICATIONS

This application is based upon and claims the benefit of priority from prior Japanese Patent Application No. 2005-189844, filed Jun. 29, 2005, the entire contents of which are incorporated herein by reference.

BACKGROUND OF THE INVENTION

1. Field of the Invention

The present invention relates to an image forming apparatus which transfers facsimile data received from the outside, and a facsimile data transfer method of an image forming apparatus.

2. Description of the Related Art

A multifunction peripheral (MFP) which is an image forming apparatus having a plurality of functions such as a facsimile function is known. Examples of the facsimile function of the MFP include a function of transferring received facsimile data to other fax machines, or of transferring it to another MFP or to PCs by Internet fax or e-mail via a network. As the transfer of received facsimile data, transfer by F-code relay using, for example, "SUB" is performed.

In F-code relay, transfer boxes to which predetermined numbers determined in advance within 20 digits as "SUB" have been assigned as names are prepared in a receiving device, and facsimile data transfer methods and transfer destinations are set in the transfer boxes. Then, at the time of transmitting a facsimile, a sender performs facsimile transmission so as to assign a number set as "SUB" by a transmitting device. The receiving device which has received the facsimile data having the "SUB" assigned thereto transfers the received facsimile data in accordance with a transfer setting set in a transfer box corresponding to the number which is denoted by the "SUB" assigned to the facsimile data. In this way, when a user performs facsimile transfer, the user uses an MFP in which a transfer function based on "SUB" can be set while being conscious of whether or not an attempt is made to perform transfer based on "SUB".

Note that a technology is known in which an intention of a receiving side is reflected to sorting of received data to a confidential box by sorting the received data to the confidential box in accordance with a box selection table in which telephone numbers of senders and confidential box numbers are made to correspond to one another.

With respect to facsimile data transfer by F-code relay, it is necessary for a sender to instruct a receiving device to perform operations set in advance at the time of transmitting facsimile. More specifically, unless the sender consciously inputs a number corresponding to "SUB" set in advance, it is impossible to transfer or the like received facsimile data at the receiving device. It is assumed that there are prepared transfer boxes with transmitting terminal identification data generally added to facsimile data being as names of the transfer boxes, and the transfer boxes are utilized for F-code relay. In such a case, even if a sender does not input "SUB", it is possible for a receiving device to automatically transfer facsimile data in accordance with a transfer setting in a transfer box to which a number denoted by the transmitting terminal identification data has been assigned as a name thereof.

By the way, there is an MFP which has a facsimile data transfer function by F-code relay utilizing "SUB" and a facsimile data transfer function by transmitting terminal identification data, and which can prepare a transfer box given a name that a number set as "SUB" and a number denoted by transmitting terminal identification data correspond to each other. When, in this MFP, a user who has prepared a transfer box by F-code relay transmits facsimile data without "SUB" being assigned, an attempt is made to not cause the MFP to execute a transfer function, but perform usual reception-to-print.

In such a case, however, a facsimile data transfer function based on transmitting terminal identification data may be made available. In this case, facsimile data is transferred on the basis of a transfer setting in a transfer box to which a number denoted by transmitting terminal identification data has been assigned as a name thereof, without the user's intention.

BRIEF SUMMARY OF THE INVENTION

The present invention has been achieved in consideration of the above-described circumstances, and an object of the present invention is to provide an image forming apparatus which, even if transfer boxes are provided in which a transfer setting for transferring facsimile data on the basis of transmitting terminal identification data has been set, it is possible to prevent facsimile data from being transferred on the basis of the transfer setting set in the transfer box corresponding to transmitting terminal identification data when a user transmits facsimile data so as to be unconscious of that facsimile data is transferred with the transfer setting set in the transfer box, and to provide a facsimile data transfer method of an image forming apparatus.

An image forming apparatus according to the invention comprises: a communication unit configured to communicate with a plurality of computers connected via a network; a receiving unit configured to receive facsimile data having at least transmitting terminal identification data added thereto, from the outside; a printing unit configured to print the facsimile data received at the receiving unit; a transfer unit configured to transfer all the facsimile data received at the receiving unit to a predetermined transfer destination; a memory unit configured to store transfer boxes to which numbers denoted by transmitting terminal identification data are assigned as names and onto which transfer settings for transferring facsimile data have been applied, and transfer boxes to make F-code relay; a first determination unit configured to determine whether or not a number for making F-code relay is designated to the facsimile data received at the receiving unit; a second determination unit configured to, when the first determination unit determines that the number is not designated, determine whether or not a transfer function based on a transfer setting set in a transfer box corresponding to a number denoted by the transmitting terminal identification data is made available; a search unit configured to, when the second determination unit determines that the transfer function based on the transfer setting is made available, search from the memory unit a transfer box to which a name corresponding to the transmitting terminal identification data has been assigned; a third determination unit configured to, when a transfer box is searched at the search unit, determine whether or not F-code information denoting F-code relay is stored so as to be associated with the searched transfer box; and a processing unit configured to, when the third determination unit determine that F-code information is stored so as to be associated, perform predetermined processing without transferring based on a transfer setting set in the transfer box corresponding to the number denoted by the transmitting terminal identification data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view showing a display example of a display unit of a PC when registration is selected by the PC in the embodiment;

FIG. 5 is a view showing a display example of the display unit when a new button is input in the embodiment;

Figure 6:
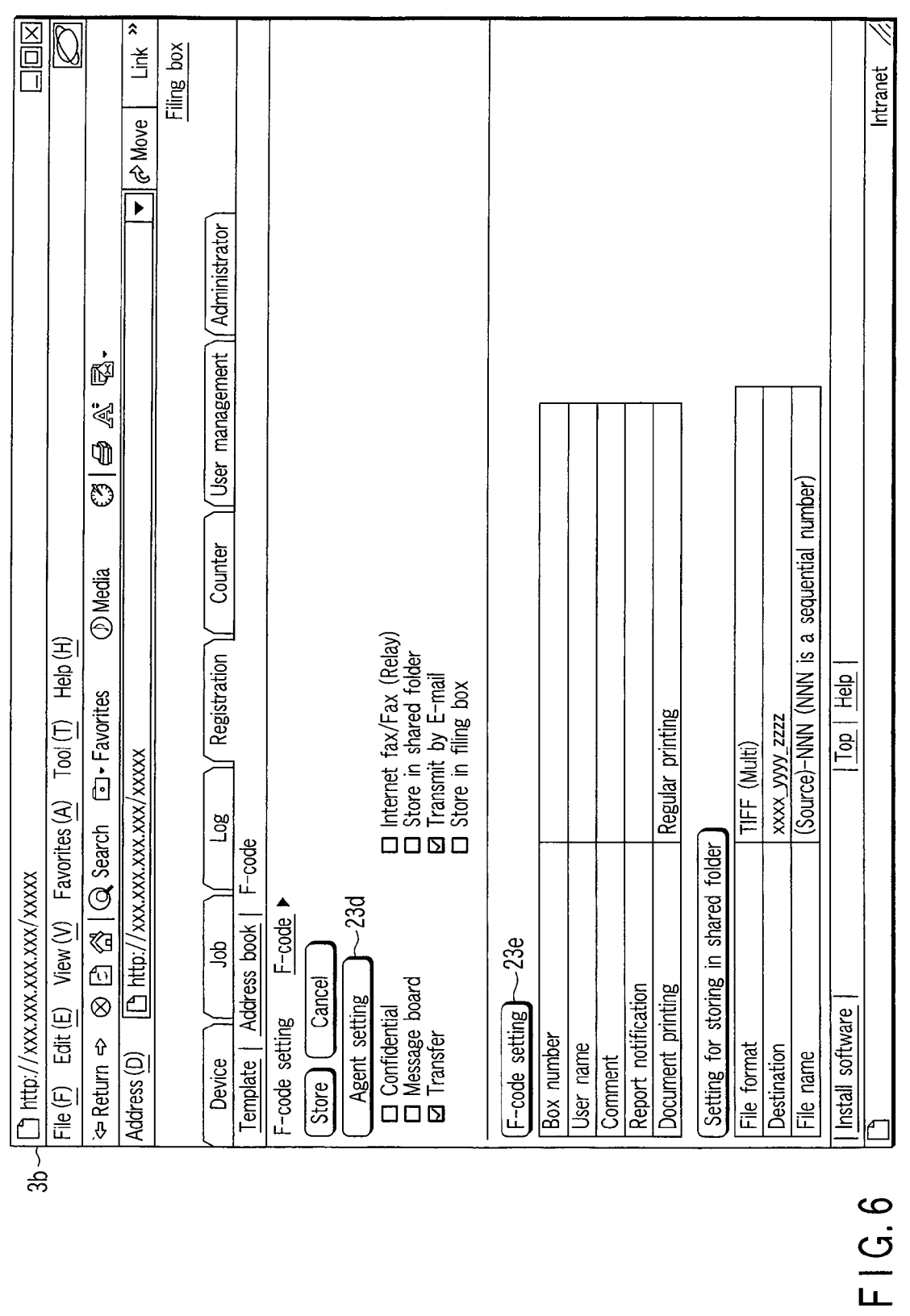

FIG. 6 is a view showing a display example of the display unit when an icon for making agent setting is input in the embodiment;

FIG. 7 is a view showing a display example of the display unit at the time of setting a box number in the embodiment;

DETAILED DESCRIPTION OF THE INVENTION

Hereinafter, one embodiment of the present invention will be described with reference to the drawings.

Figure 1:
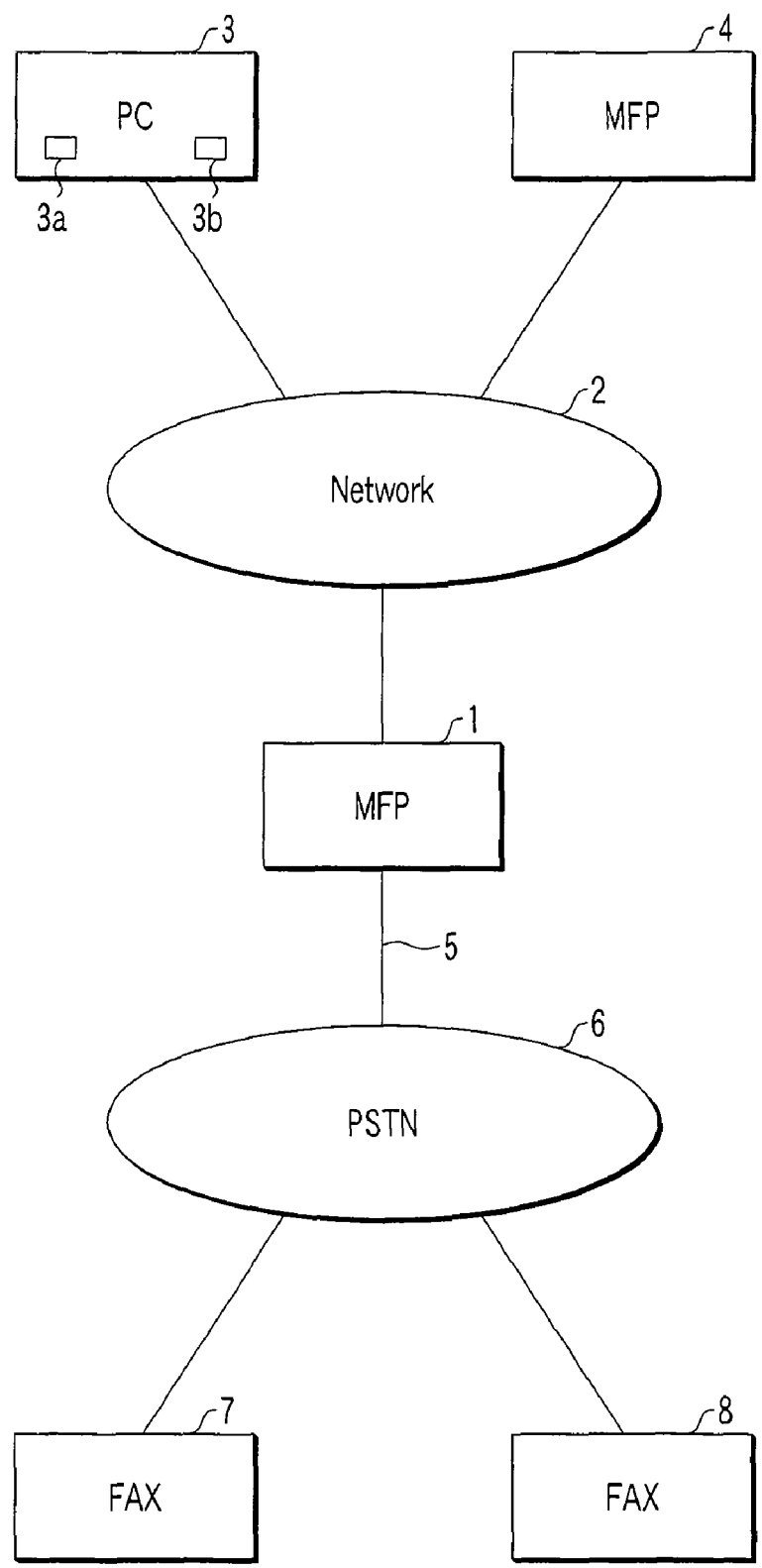
FIG. 1 is a diagram schematically showing a network configuration in an embodiment of the present invention.

FIG. 1 is a diagram schematically showing a network configuration to which a multifunction peripheral (MFP) 1 is connected. The MFP 1 is a multifunction printer having a facsimile function, a printer function, a copy function, a scanner function, a network function, and the like. As shown in FIG. 1, the MFP 1 is connected to a PC 3 and an MFP 4 via a network 2. The PC 3 has an operating unit 3a and a display unit 3b. In this embodiment, description will be given to a case in which one PC 3 and one MFP 4 are connected to the network 2 having the MFP 1 connected thereto. However, the numbers of the PC 3 and the MFP 4 are not limited thereto. Note that an address of the PC 3 in the network 2 is "xxxxxxxxxx@xx.jp".

Further, the MFP 1 is connected to a PSTN 6 via a public switched telephone network (PSTN) subscriber line 5. A fax 7 and a fax 8 are connected to the PSTN 6. "0331234567" serving as a telephone number is assigned to the fax 7. Further, the fax 7 transmits data denoting a telephone number as transmitting terminal identification data (TSI) transmitted in phase B at the time of transmitting facsimile data. TSI (a function of adding TSI, which is option under the ITU Recommendation, has been installed in most of facsimile devices of the market.) are utilized at the time of displaying on a display at a receiving device, of printing on a receiving management report, or of searching a box for performing transfer when facsimile data is received, which will be described later. Note that a case in which faxes connected to the PSTN 6 are two of the fax 7 and the fax 8 will be described. However, the number of faxes is not limited thereto.

Figure 2:
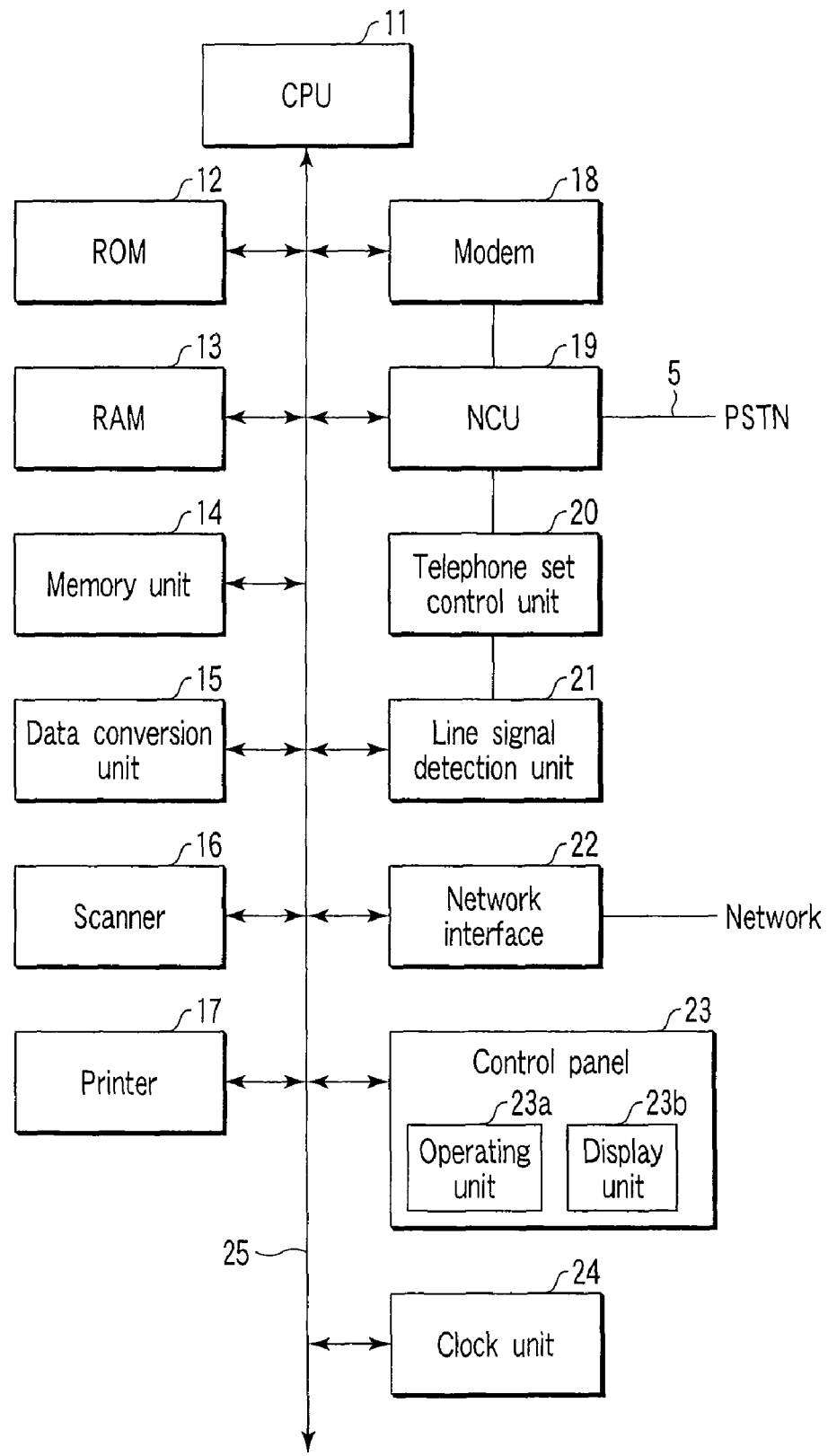
FIG. 2 is a block diagram showing a principal part configuration of an MFP in the embodiment.

FIG. 2 is a block diagram showing a principal part configuration of the MFP 1. The MFP 1 has a CPU 11, a ROM 12, a RAM 13, a memory unit 14, a data conversion unit 15, a scanner 16, a printer 17, a modem 18, an NCU 19, a telephone set control unit 20, a line signal detection unit 21, a network interface 22, a control panel 23, and a clock unit 24.

Then, the CPU 11, the ROM 12, the RAM 13, the memory unit 14, the data conversion unit 15, the scanner 16, the printer 17, the modem 18, the NCU 19, the line signal detection unit 21, the network interface 22, the control panel 23, and the clock unit 24 are connected to one another via a bus line 25. Further, the modem 18 and the telephone set control unit 20 are connected to the NCU 19. Moreover, the line signal detection unit 21 is connected to the telephone set control unit 20.

The CPU 11 realizes operations serving as the MFP 1 by performing control processing for overall controlling respective units on the basis of a control program stored in the ROM 12. The ROM 12 stores a control program and the like of the CPU 11. The RAM 13 is used as a work area for storing various information required for the CPU 11 to perform various processings.

The memory unit 14 is, for example, a hard disk drive (HDD). The memory unit 14 temporarily stores image data, and stores data relating to various settings such as settings of boxes. The boxes are prepared so as to be denoted by names for a predetermined purpose. The details of the boxes will be described later. The data conversion unit 15 applies encoding processing for compressing redundancy onto image data, and decodes image data on which encoding for compressing redundancy has been applied. The scanner 16 reads a transmitting document, and generates image data denoting the transmitting document. The printer 17 prints an image denoted by the image data onto a recording paper.

The modem 18 generates a facsimile transmission signal by modulating image data, or generates a command transmission signal by modulating a command provided from the CPU 11. The modem 18 transmits these transmission signals to the PSTN subscriber line 5 via the NCU 19. The modem 18 also reproduces image data by demodulating the facsimile transmission signal which arrives via the PSTN subscriber line 5 and is provided via the NCU 19, or reproduces a command by demodulating the command transmission signal. The PSTN subscriber line 5 contained in the PSTN 6 is connected to the NCU 19. Then, the NCU 19 performs status supervision or call processing to a network with respect to the connected PSTN subscriber line 5. Further, the NCU 19 makes a setting of a level of a facsimile transmission signal to be transmitted to the PSTN subscriber line 5, and the like. An external telephone set is connected to the telephone set control unit 20 as needed. The line signal detection unit 21 receives via the NCU 19 and the telephone set control unit 20 a signal which arrives via the PSTN subscriber line 5, and detects an arrival of a predetermined signal.

The network interface 22 is used for connection with the network 2. The network interface 22 performs data transmission via the network 2. The control panel 23 includes an operating unit 23a for receiving various directive inputs with respect to the CPU 11 by a user, and a display unit 23b for displaying various information which must be informed to a user under control of the CPU 11. The clock unit 24 performs timekeeping operations full-time, and outputs current time information denoting a current time.

Next, a box to be prepared in the memory unit 14 will be described. A box is prepared, for example, in the following cases by a user. A box is prepared for a user to store data of specific documents and images, and the like. As a name of the box in this case, for example, a name of the user or an arbitrary number is assigned. Further, a box is prepared for user to make F-code relay. As a name of the box in this case, an arbitrary name determined by the user, for example, a number denoting TSI is assigned, and a setting for transferring facsimile data is stored in this box.

Subsequently, operations of the user at the time of preparing a box will be specifically described with reference to FIGS. 3 to 7. Description will be given to a case in which the user makes a transfer setting for received facsimile data which has been received by the MFP 1 connected to the network 2, by using the PC 3.

FIGS. 3 to 7 show display screens displayed on the display unit 3b of the PC 3 at the time of making a transfer setting for received facsimile data which has been received by the MFP 1. A menu screen in which "Device", "Job", "Log", "Registration", "Counter", "User management", and "Administrator" are displayed as items is displayed on the display unit 3b. This menu screen can be called up on the display unit 3b of the PC 3 when a user operates the operating unit 3a of the PC.

Figure 3:
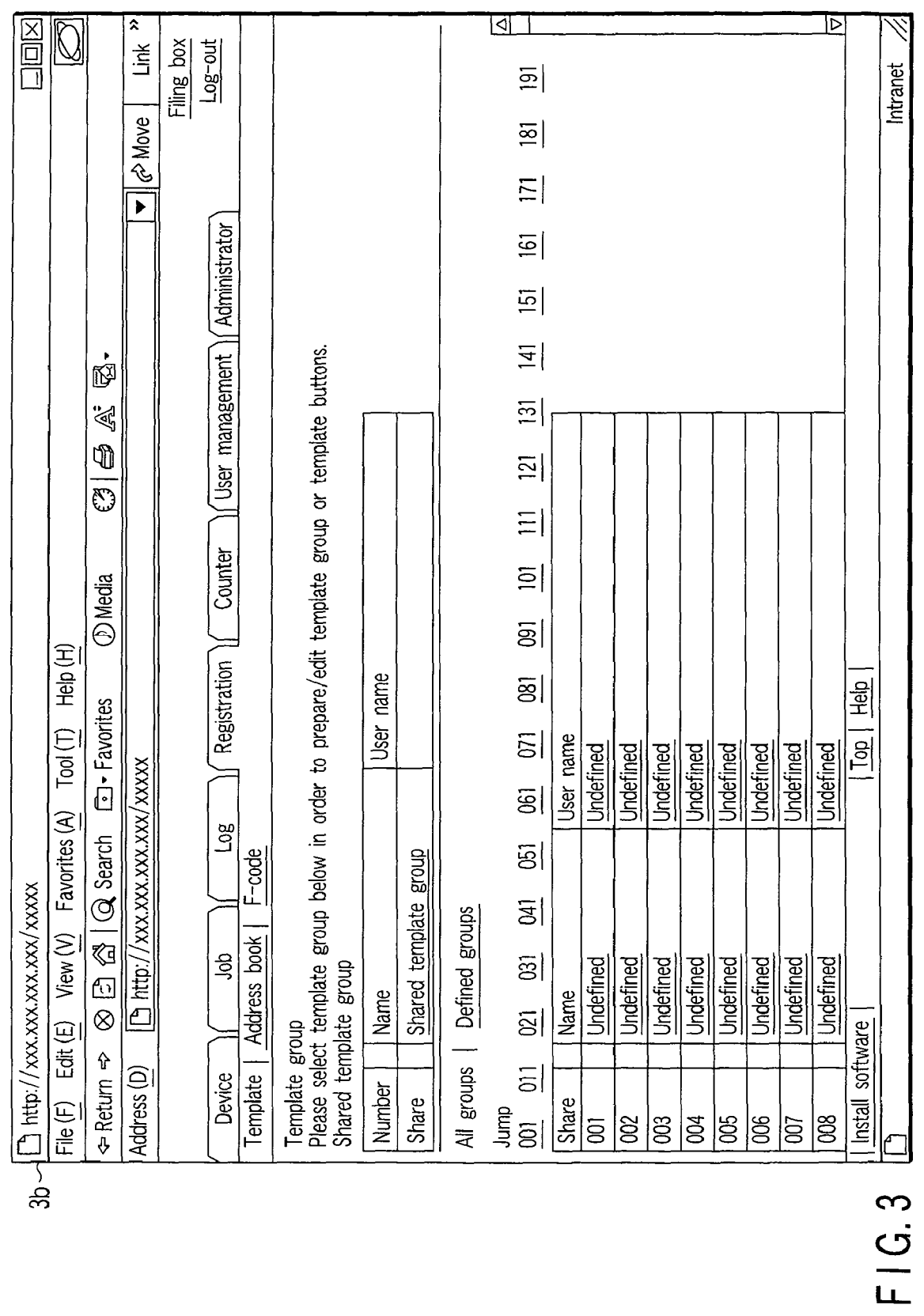

When "Registration" is selected from the respective items, a screen in which the contents relating to "Template" can be registered is displayed on the display unit 3b as shown in FIG. 3. Further, in the screen in which "Registration" has been selected, not only the item of "Template" but also items of "Address book" and "F-code" are displayed so as to be selectable. The user selects "F-code" by operating the operating unit 3a for making a transfer setting.

Figure 4:
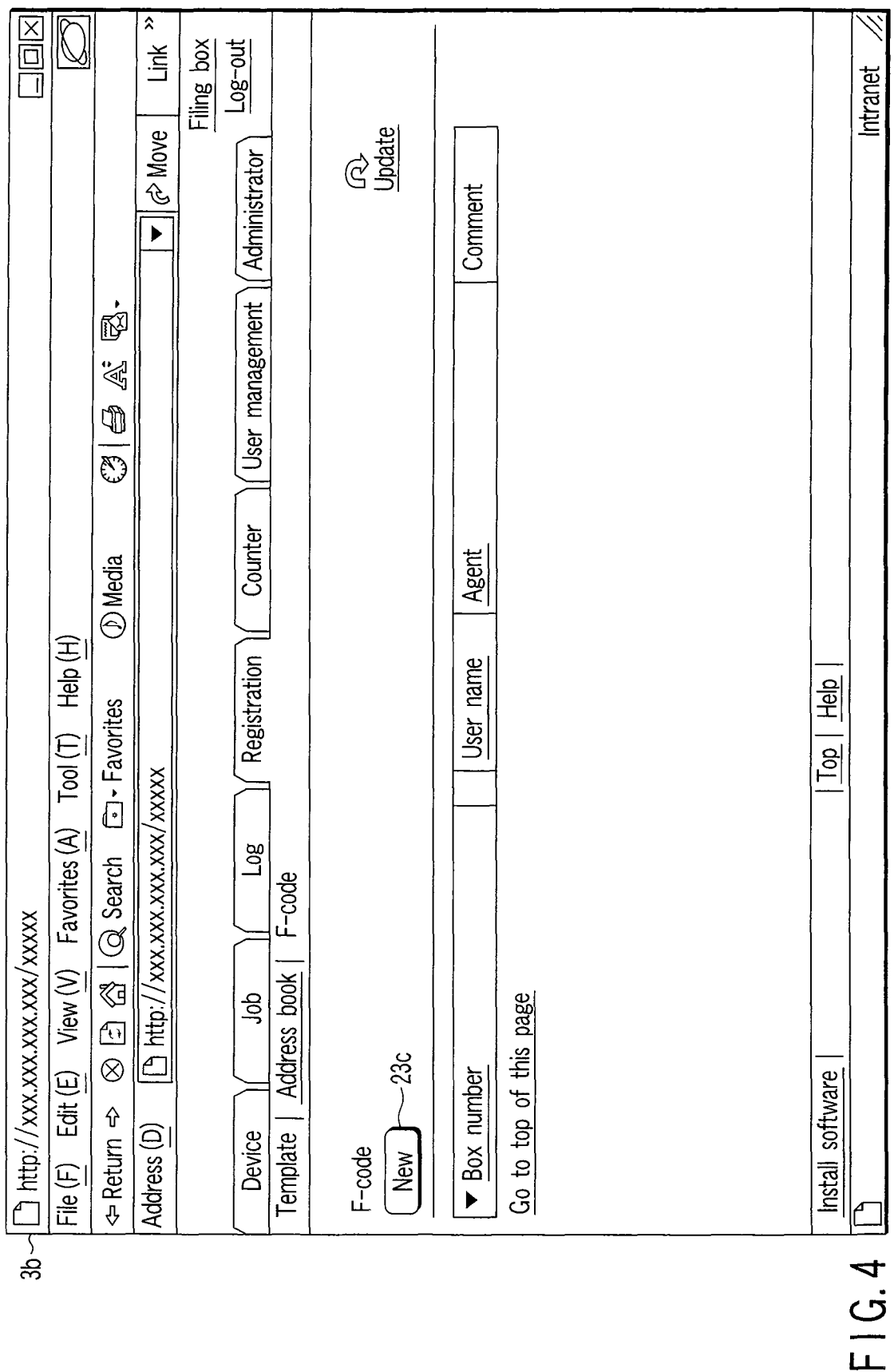
FIG. 4 is a view showing a display example of the display unit when F-code is selected in the embodiment.
Figure 5:
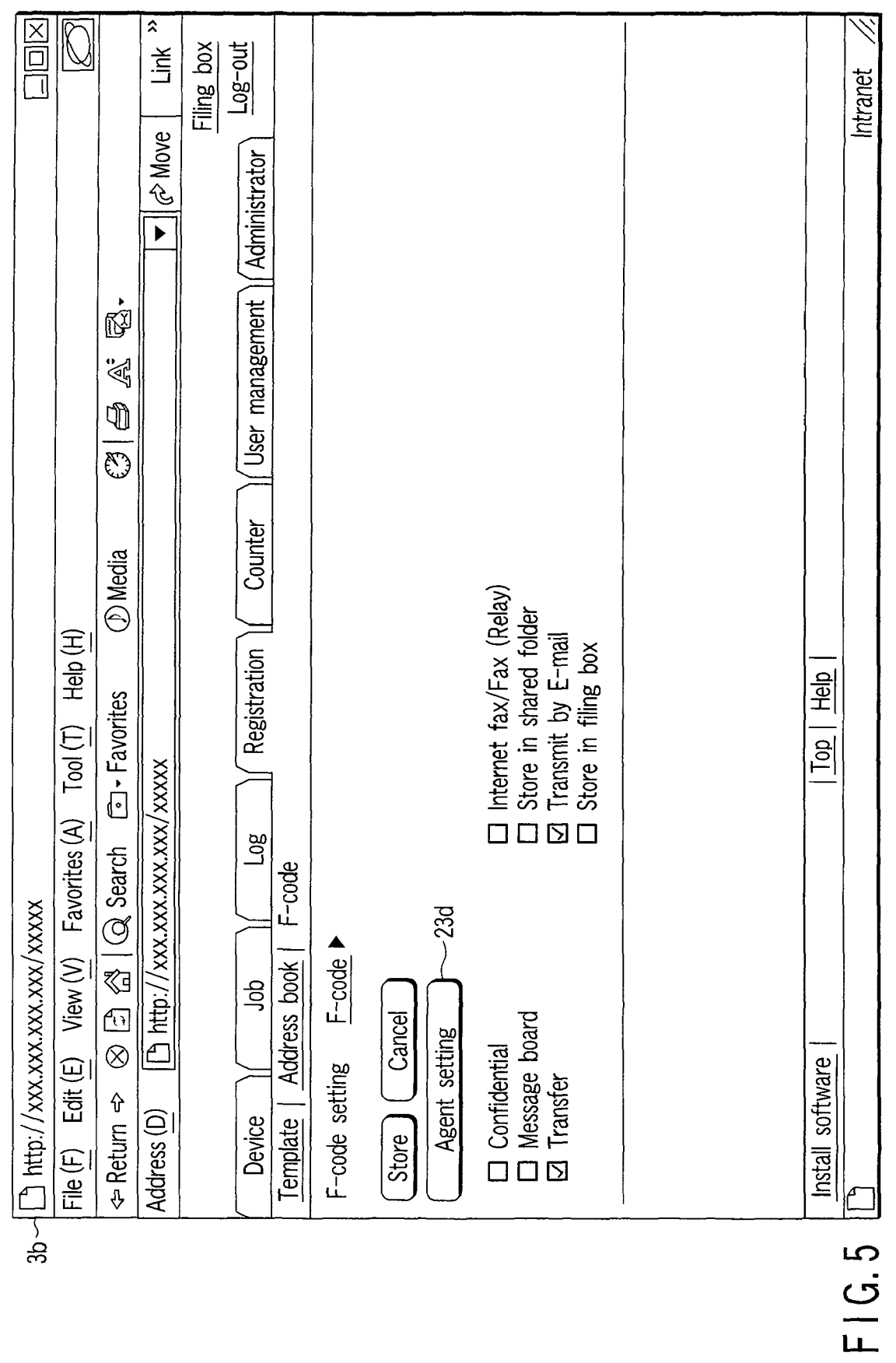

FIG. 4 shows a screen displayed on the display unit 3b when the item of "F-code" is selected. When F-code is newly set, the user operates the operating unit 3a to input a new button 23c. When the new button 23c is input, an F-code setting screen is displayed on the display unit 3b as shown in FIG. 5. Check boxes of "Confidential", "Message board", and "Transfer" are displayed on the setting screen. In FIG. 5, the check box of "Transfer" is checked. Then, check boxes of "Internet fax/Fax (Relay)", "Store in shared folder", "Transmit by e-mail", and "Store in filing box" are displayed as transfer destinations on the setting screen. The user operates the operating unit 3a to set a desired transfer destination by checking a check box. Since "Transmit by e-mail" is checked in FIG. 5, an E-mail address is set as a transfer destination.

Subsequently, methods for setting a box number, a password, and a transfer destination will be described. First, the user operates the operating unit 3a to input an icon 23d of "Agent setting" shown in FIG. 5. When the icon 23d is input, a display shown in FIG. 6 which includes an icon 23e of "F-code setting" for setting F-code is indicated on the display unit 3b. When the icon 23e is input on the display screen, a screen shown in FIG. 7 for setting a box number, a password, and a transfer destination is displayed. Then, the user inputs a number of TSI in the column of the box number in the display of FIG. 7. For example, when facsimile data received from the fax 7 is transferred to the PC 3 by E-mail, as shown in FIG. 7, "0331234567" is set as a box number, "123456" is set as a password for prohibiting an unauthorized access to the box by a third party, and "xxxxxxxxxx@xx.jp" is set as a transfer destination. Additionally, a user name and the like are input as needed by the user. As shown in FIG. 7, Print is selected as a setting for reception-to-print on whether or not document printing is performed at the time of receiving the data. Then, a store button 23f is input to store the transfer setting.

Figure 8:
FIG. 8 is a view showing a table showing relationships between boxes and transfer settings in the embodiment.

FIG. 8 is a table T serving as memory means showing the boxes prepared in the memory unit 14 and the contents of the transfer destinations set in the boxes.

In the table T, box numbers, attributes of the box numbers, passwords, transfer destinations, and setting or not for reception-to-print are stored so as to be associated with one another. Note that numbers denoting TSI (telephone numbers) used as the box numbers are also used as a number "SUB" designated at the time of making F-code relay. For example, as shown in FIG. 8, the box number "0331234567" is also used as a number designated at the time of transferring facsimile data based on SUB, and is also used as a number at the time of searching a box number when facsimile data is transferred based on TSI which will be described later. Because the setting described in FIGS. 3 to 7 is stored in the box number "0331234567", "Transfer" is set as an attribute, "123456" is set as a password, "xxxxxxxxxx@xx.jp" is set as a transfer destination, and "Do" is set as setting or not for reception-to-print. "Confidential", "Relay", and "Message board" are respectively set as attributes in the other box numbers.

Note that a setting on whether a TSI transfer function by which received facsimile data is transferred on the basis of a transfer setting set in the box when a box number serving as a name of a box prepared in this way and a number denoted by TSI correspond to each other is made available or unavailable can be set in advance due to the user operating the operating unit 23a. In this embodiment, the TSI transfer function is made available.

Figure 9:
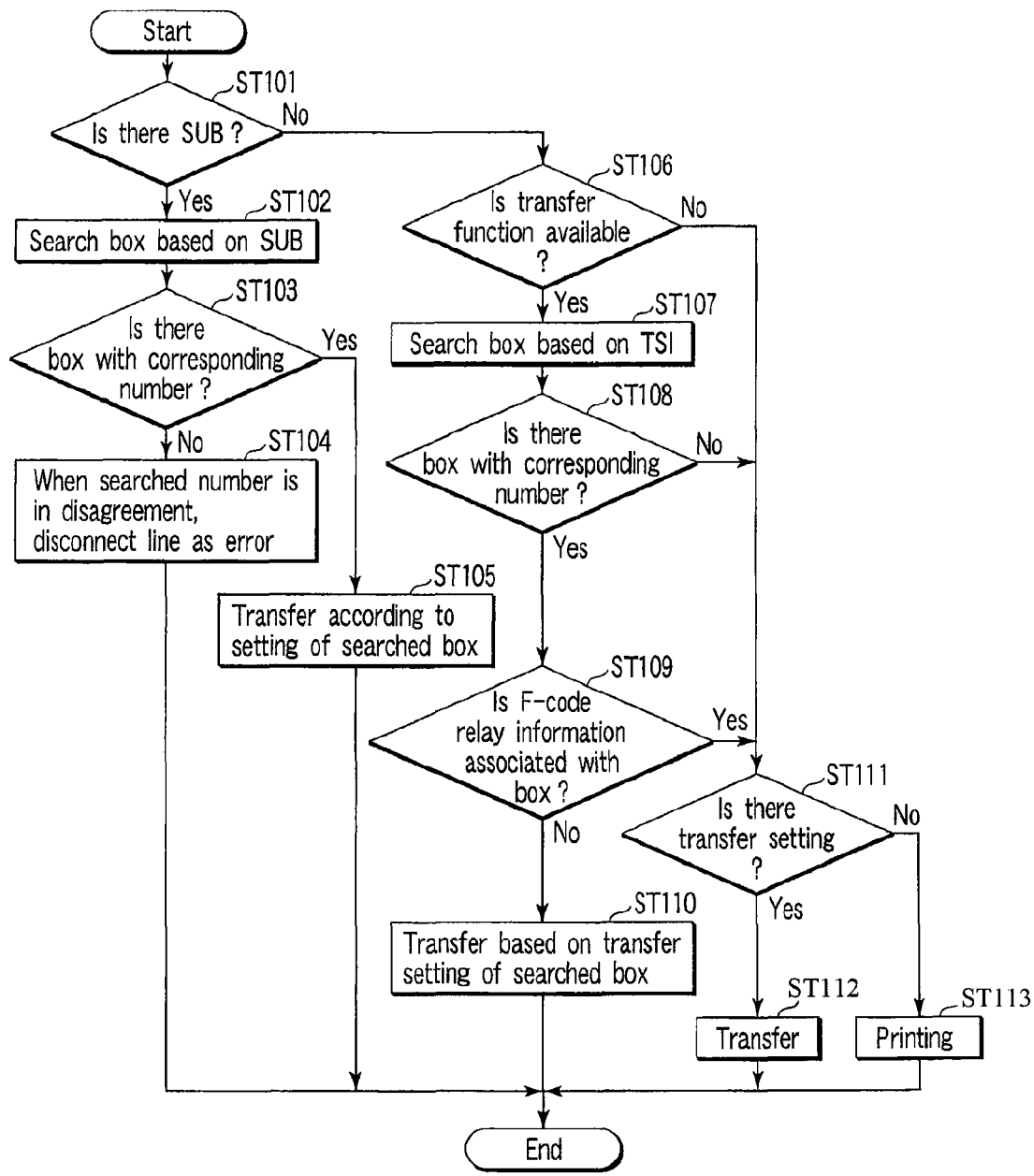
FIG. 9 is a flowchart showing a principal part of processing executed by the CPU at the time of receiving facsimile data in the embodiment.

Next, facsimile data transfer processing executed by the CPU 11 at the time of receiving facsimile data will be described. FIG. 9 is a flowchart showing a principal part of the facsimile data transfer processing.

When the CPU 11 receives facsimile data via the PSTN 6, the CPU 11 determines whether or not SUB is assigned to the facsimile data (ST101, first determination means). When determining that SUB is provided to the facsimile data (YES in ST101), the CPU 11 searches whether or not a box with a number corresponding to a number denoted by the SUB is prepared (ST102). This searching is carried out with reference to the table T in the memory unit 14. Then, the CPU 11 determines whether or not there is a box with a number corresponding to the number denoted by the SUB in the table on the basis of a result of the search (ST103). When determining that there is no box with a number corresponding to the number denoted by the SUB (NO in ST103), the line is disconnected due to the fact that the numbers do not correspond to one another, and the processing is terminated as an error (ST104). In this way, when the numbers do not correspond to one another, the facsimile data is not received. Further, when it is determined that there is a box with a number corresponding to the number denoted by the SUB (YES in ST102), the CPU 11 transfers the facsimile data once stored in the searched box to a transfer destination set in the searched box (ST105).

On the other hand, when it is determined that SUB is not provided to the received facsimile data (NO in ST101), the CPU 11 determines whether or not a TSI transfer function is made available (ST106, second determination means). When it is determined that the TSI transfer function is made available (YES in ST106), the CPU 11 searches whether or not there is a box with a number corresponding to a number denoted by the TSI (ST107, search means). This searching is carried out with reference to the table T. Then, the CPU 11 determines whether or not there is a box with a number corresponding to the number denoted by the TSI in the table on the basis of a result of the search (ST108). When determining that there is a box with a number corresponding to the number (YES in ST108), the CPU 11 determines whether or not F-code information is stored so as to be associated with the box number (ST109, third determination means). F-code information is information denoting F-code relay, and specifically shows Confidential, Message board, and Relay in an area of the attribute, and passwords in the table T of FIG. 8. In other words, when an attribute of a searched box number is one of Confidential, Message board, and Relay, or a password is set, it is determined that F-code information is stored so as to be associated therewith. When it is determined that F-code information is not stored so as to be associated with the searched number (NO in ST109), the CPU 11 transfers the facsimile data once stored in the box on the basis of the set contents set in the box (ST110). When it is determined that there is no box with a box number corresponding thereto (NO in ST108), and when it is determined that F-code information is stored so as to be associated with the searched number (YES in ST109), the CPU 11 determines whether or not a transfer setting has been made (ST111). There has been conventionally this transfer setting, which is to determine whether or not a setting for uniformly transferring received facsimile data to a transfer destination set in advance has been applied. When determining that the transfer setting has been made (YES in ST111), the CPU 11 transfers the facsimile data to a transfer destination set in advance (ST112). When determining that the transfer setting has not been made (NO in ST111), the CPU 11 carries out printing by controlling the printer 17 on the basis of the received facsimile data (ST113). Processing means is constituted by these steps S111 to ST113.

Next, an effect when the MFP 1 configured as described above receives from the fax 7 facsimile data to which SUB is not assigned will be described. More specifically, a case in which a user performs facsimile transmission to the MFP 1 without designating "SUB" by using the fax 7.

When the MFP 1 receives facsimile data from the fax 7, the MFP 1 determines whether or not it is necessary to make F-code relay performed due to designation by "SUB". Because there is no designation by "SUB", it is determined that there is no need to make F-code relay. Then, because the TSI transfer function is made available, the MFP 1 searches from the table T whether or not there is a box with a box number corresponding to "0331234567" assigned to the facsimile data and denoted by the TSI. Consequently, a box with the box number "0331234567" corresponding to "0331234567" denoted by the TSI is searched. The MFP 1 determines whether or not F-code information is stored so as to be associated with the box number, i.e., whether or not a password is set in the box number, or an attribute is one of Confidential, Message board, and Relay. A password is set in the box number "0331234567" with reference to the table T, and thus, it is determined that the box is a box having F-code information stored therein so as to be associated. In this way, when it is determined that the box is a box having F-code information stored therein so as to be associated, the MFP 1 makes the TSI transfer function unavailable. Because the TSI transfer function is made unavailable as described above, the MFP 1 performs printing onto a medium by controlling the printer 17 on the basis of the transfer setting and the received facsimile data.

In accordance with the MFP 1 of the embodiment, in the case where a number denoted by "SUB" and a number denoted by TSI correspond to each other, a user may perform facsimile transmission with respect to the MFP 1 without designation by "SUB" from the fax 7 even when a box for making F-code relay with the number being as a box number is prepared, i.e., the user may perform facsimile transmission with the intention to not perform transfer by F-code relay. In such a case, even when the TSI transfer function of the MFP 1 is made available, F-code information denoting F-code is associated with the box number corresponding to the number denoted by the TSI. For this reason, the TSI transfer function is made unavailable, and the routine follows step ST111 in FIG. 9. More specifically, the intention of the user who has not performed facsimile transmission with designation of "0331234567" as "SUB" is reflected.

Accordingly, even if a transfer box is provided in which a transfer setting for transferring facsimile data on the basis of a number denoted by TSI, it is possible to prevent the facsimile data from being transferred on the basis of the transfer setting set in the transfer box corresponding to the TSI when a user transmits the facsimile data without the intention of transferring facsimile data on the basis of the transfer setting set in the transfer box.

Further, when F-code is set, attributes for realizing F-code relay, such as Confidential, Message board, and Relay, are set so as to be associated with transfer boxes in order to utilize in the PC 3 and the like connected to the network 2. In addition, passwords for preventing unauthorized browsing of image data and the like in the transfer boxes by third parties are set so as to be associated with the transfer boxes. When facsimile data without "SUB" being assigned is received and a TSI transfer function is made available, the MFP 1 determines whether or not F-code information is stored so as to be associated with a box number corresponding to a number denoted by TSI by utilizing one of attributes or a password set in the transfer box for making F-code relay. Therefore, it is possible to precisely determine whether or not a searched box is a box for making F-code relay.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a communication unit configured to communicate with a plurality of computers connected via a network;
   a receiving unit configured to receive facsimile data having at least transmitting terminal identification data added thereto, from the outside;
   a printing unit configured to print the facsimile data received at the receiving unit;
   a transfer unit configured to transfer all the facsimile data received at the receiving unit to a predetermined transfer destination;
   a memory unit configured to store transfer boxes to which numbers denoted by transmitting terminal identification data are assigned as names and onto which transfer settings for transferring facsimile data have been applied, and transfer boxes to make F-code relay;
   a first determination unit configured to determine whether or not a number for making F-code relay is designated to the facsimile data received at the receiving unit;
   a second determination unit configured to, when the first determination unit determines that the number is not designated, determine whether or not a transfer function based on a transfer setting set in a transfer box corresponding to a number denoted by the transmitting terminal identification data is made available;

a search unit configured to, when the second determination unit determines that the transfer function based on the transfer setting is made available, search the memory unit for a transfer box to which a name corresponding to the transmitting terminal identification data has been assigned;

a third determination unit configured to, when the transfer box is searched for by the search unit, determine whether or not F-code information denoting F-code relay is stored so as to be associated with the searched-for transfer box;

a fourth determination unit configured to, when the third determination unit determines that F-code information is stored so as to be associated, determine whether or not a setting has been made to transfer the received facsimile data to the predetermined transfer destination uniformly, without transferring based on the transfer setting set in the transfer box corresponding to the number denoted by the transmitting terminal identification data; and a processing unit configured to, when the fourth determination unit determines that the setting has been made to transfer uniformly, transfer the received facsimile data to the predetermined transfer destination, and when the fourth determination unit determines that the setting has not been made to transfer uniformly, print the received facsimile data, wherein the third determination unit determines that the F-code information is stored so as to be associated with the searched-for transfer box if an attribute of the searched-for transfer box is one of Confidential, Message board, and Relay or if a password is set for the searched-for transfer box.

2. An image forming apparatus comprising:

communication means for communicating with a plurality of computers connected via a network;

receiving means for receiving facsimile data having at least transmitting terminal identification data added thereto, from the outside;

printing means for printing the facsimile data received at the receiving means;

transfer means for transferring all the facsimile data received at the receiving means to a predetermined transfer destination;

memory means for storing transfer boxes to which numbers denoted by transmitting terminal identification data are assigned as names and onto which transfer settings for transferring facsimile data have been applied, and transfer boxes to make F-code relay;

first determination means for determining whether or not a number for making F-code relay is designated to the facsimile data received at the receiving means;

second determination means for, when the first determination means determines that the number is not designated, determining whether or not a transfer function based on a transfer setting set in a transfer box corresponding to a number denoted by the transmitting terminal identification data is made available;

search means for, when the second determination means determines that the transfer function based on the transfer setting is made available, searching the memory means for a transfer box to which a name corresponding to the transmitting terminal identification data has been assigned;

third determination means for, when the transfer box is searched for by the search means, determining whether or not F-code information denoting F-code relay is stored so as to be associated with the searched-for transfer box;

fourth determination means for, when the third determination means determines that F-code information is stored so as to be associated, determining whether or not a setting has been made to transfer the received facsimile data to the predetermined transfer destination uniformly, without transferring based on the transfer setting set in the transfer box according to the number denoted by the transmitting terminal identification data; and processing means for, when the fourth determination means determines that the setting has been made to transfer uniformly, transferring the received facsimile data to the predetermined transfer destination, and when the fourth determination means determines that the setting has not been made to transfer uniformly, printing the received facsimile data, wherein the third determination means determines that the F-code information is stored so as to be associated with the searched-for transfer box if an attribute of the searched-for transfer box is one of Confidential, Message board, and Relay or if a password is set for the searched-for transfer box.

3. A facsimile data transfer method of an image forming apparatus having: a communication unit which makes communication with a plurality of computers connected via a network; and a memory unit which stores transfer boxes to which numbers denoted by transmitting terminal identification data are assigned as names and onto which transfer settings for transferring facsimile data have been applied, and transfer boxes to make F-code relay, the method comprising:

determining whether or not a number for making F-code relay is designated to facsimile data having at least transmitting terminal identification data added thereto, the facsimile data being received from the outside;

when it is determined that the number is not designated, determining whether or not a transfer function based on a transfer setting set in a transfer box corresponding to a number denoted by the transmitting terminal identification data is made available;

when it is determined that the transfer function based on the transfer setting is made available, searching the memory unit for a transfer box to which a name corresponding to the transmitting terminal identification data has been assigned;

when the transfer box is searched for, determining whether or not F-code information denoting F-code relay is stored so as to be associated with the searched-for transfer box;

when it is determined that F-code information is stored so as to be associated, determining whether or not a setting has been made to transfer the received facsimile data to the predetermined transfer destination uniformly, without transferring based on the transfer setting set in the transfer box corresponding to the number denoted by the transmitting terminal identification data; and when it is determined that the setting has been made to transfer uniformly, transferring the received facsimile data to the predetermined transfer destination, and when it is determined that the setting has not been made to transfer uniformly, printing the received facsimile data, wherein it is determined that the F-code information is stored so as to be associated with the searched-for transfer box if an attribute of the searched-for transfer box is one of Confidential, Message board, and Relay or if a password is set for the searched-for transfer box.

* * * * *